(12) United States Patent
Nakano et al.

(10) Patent No.: US 10,873,600 B2
(45) Date of Patent: Dec. 22, 2020

(54) INFORMATION PROCESSING DEVICE, INFORMATION PROCESSING SYSTEM, INFORMATION PROCESSING METHOD, AND INFORMATION PROCESSING PROGRAM

(71) Applicant: PANASONIC INTELLECTUAL PROPERTY MANAGEMENT CO., LTD., Osaka (JP)

(72) Inventors: Toshihisa Nakano, Osaka (JP); Jun Anzai, Kanagawa (JP); Masato Tanabe, Aichi (JP); Kaoru Yokota, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 329 days.

(21) Appl. No.: 15/947,105

(22) Filed: Apr. 6, 2018

(65) Prior Publication Data

US 2018/0316721 A1 Nov. 1, 2018

(30) Foreign Application Priority Data

Apr. 11, 2017 (JP) ................................. 2017-078327
Sep. 13, 2017 (JP) ................................. 2017-175751

(51) Int. Cl.
*H04L 29/06* (2006.01)
*H04L 29/08* (2006.01)
*H04L 12/40* (2006.01)
*H04L 12/66* (2006.01)
*H04L 12/46* (2006.01)

(52) U.S. Cl.
CPC .......... *H04L 63/1466* (2013.01); *H04L 12/40* (2013.01); *H04L 12/40013* (2013.01);
(Continued)

(58) Field of Classification Search
CPC ............. H04L 63/0272; H04L 63/0227; H04L 63/1408; H04L 67/12; H04L 12/40013;
(Continued)

(56) References Cited

U.S. PATENT DOCUMENTS 8,848,608 B1* 9/2014 Addepalli ............. H04W 48/06
370/328
8,955,130 B1* 2/2015 Kalintsev .............. G06F 21/567
701/415

(Continued)

FOREIGN PATENT DOCUMENTS

JP 4308287 5/2009
JP 2011-250098 12/2011

*Primary Examiner* — Matthew Smithers
(74) *Attorney, Agent, or Firm* — Greenblum & Bernstein, P.L.C.

(57) ABSTRACT

An information processing device is provided. A first communication unit transmits and receives communication data through a network. The network is connected to a first gateway, a second gateway, and at least one electronic control unit. A monitoring unit determines whether the communication data is normal. A notification unit transmits, at least to the second gateway, a notification that brings the network to a state in which one of a transfer function of the first gateway and a transfer function of the second gateway is active and the other one of the transfer functions is inactive, when the monitoring unit determines that the communication data is not normal.

14 Claims, 9 Drawing Sheets

(52) U.S. Cl.
CPC .......... *H04L 12/4625* (2013.01); *H04L 12/66* (2013.01); *H04L 63/1425* (2013.01); *H04L 67/12* (2013.01); *H04L 2012/40215* (2013.01)

(58) Field of Classification Search
CPC ..... H04L 12/4625; H04L 12/66; H04L 12/40; H04L 47/2483; H04L 2012/40215; H04L 2012/40273; H04L 63/1466; H04L 63/1425
See application file for complete search history.

(56) References Cited

U.S. PATENT DOCUMENTS

| | | | | |
|---|---|---|---|---|
| 9,172,635 | B2 * | 10/2015 | Kim | H04L 45/28 |
| 9,401,923 | B2 * | 7/2016 | Valasek | G06F 21/562 |
| 9,686,294 | B2 * | 6/2017 | Kantor | H04W 12/12 |
| 2004/0083043 | A1 * | 4/2004 | Akiyama | B60W 50/04 701/48 |
| 2007/0030844 | A1 * | 2/2007 | Fukuta | H04L 43/0817 370/359 |
| 2008/0151915 | A1 | 6/2008 | Masuya et al. | |
| 2015/0372975 | A1 * | 12/2015 | Moriya | B61L 15/0018 726/12 |
| 2016/0135038 | A1 * | 5/2016 | Ochiai | B60R 25/01 370/338 |
| 2017/0078884 | A1 * | 3/2017 | Tanabe | H04L 63/1416 |
| 2017/0093866 | A1 * | 3/2017 | Ben-Noon | G06F 21/35 |
| 2017/0244594 | A1 * | 8/2017 | Shiota | H04L 43/16 |

* cited by examiner

| CAN ID | Transfer destination |
|---|---|
| 0x011 | CAN bus 1 |
| 0x021 | CAN bus 2 |
| 0x031 | CAN bus 2 |
| 0x041 | CAN bus 3 |
| ⋮ | ⋮ |
| ⋮ | ⋮ |

INFORMATION PROCESSING DEVICE, INFORMATION PROCESSING SYSTEM, INFORMATION PROCESSING METHOD, AND INFORMATION PROCESSING PROGRAM

CROSS REFERENCE TO RELATED APPLICATIONS

The present application is based on and claims priority of Japanese Patent Application No. 2017-078327 filed on Apr. 11, 2017 and Japanese Patent Application No. 2017-175751 filed on Sep. 13, 2017. The entire disclosures of the above-identified applications, including the specifications, drawings and claims are incorporated herein by reference in their entirety.

FIELD

The present invention relates to an information processing device, an information processing system, an information processing method, and an information processing program which counter an attack against a network.

BACKGROUND

In recent years, it has been pointed out that there are attacks (hacking) against in-vehicle networks and that risks caused by these attacks are high. To be more specific, the following attack has been publicly disclosed. Using wireless communication, for example, an attacker accesses an information terminal of an automobile that is provided with a wireless connection interface for external communication. Then, after performing tampering with a program, the attacker transmits an arbitrary CAN (controller area network) command to the in-vehicle network provided in the automobile. As a result, despite the intension of a driver of the automobile, the attacker controls an actuator connected to an electronic control unit (hereinafter, referred to as an ECU).

On the other hand, there is also a risk that control may be executed despite the intension of the driver due to, for example, a failure or malfunction of the ECU.

With this being the situation, functional safety and security need to be ensured for an in-vehicle network.

As a conventional example of ensuring functional safety, a method of introducing redundancy with, for example, more ECUs is known. For example, Patent Literature (PTL) 1 discloses a network system that is provided with a plurality of gateway devices.

CITATION LIST

Patent Literature

[PTL 1] Japanese Unexamined Patent Application Publication No. 2011-250098

SUMMARY

Technical Problem

However, security is not considered in the network system disclosed in PTL 1. For example, suppose that this network system is subjected to an attack by injecting an unauthorized CAN command into a global bus. In this case, a main gateway or a sub-gateway of the network system passes this attack command, just as it is, to a local bus. In other words, the attacker can make an intrusion into the local bus of this network system.

Moreover, suppose that the network system is subjected to an attack by an attacker taking over the main gateway and then making the main gateway itself to inject an unauthorized CAN command directly into the local bus. In this case, the network system disclosed in PTL 1 cannot detect or eliminate this attack.

The present invention has an object to provide an information processing device, an information processing system, an information processing method, and an information processing program that enable a network system, which is provided with redundancy to support functional safety, to eliminate an attack that threatens security and also to maintain a function of the network system.

Solution to Problem

To achieve the aforementioned object, an information processing device according to an aspect of the present invention includes: a first communication unit which transmits and receives communication data through a network connected to a first gateway, a second gateway, and at least one electronic control unit; a monitoring unit which determines whether the communication data is normal; and a notification unit which transmits, at least to the second gateway, a notification to cause one of a transfer function of the first gateway and a transfer function of the second gateway to be active and the other one of the transfer function of the first gateway and the transfer function of the second gateway to be inactive, when the monitoring unit determines that the communication data is not normal.

Advantageous Effects

According to the present invention, even when a network system which is provided with redundancy to support functional safety detects an abnormality caused by an attack, a function of this network system can be maintained.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Embodiment 1

Hereinafter, an information processing system according to Embodiment 1 of the present invention is described, with reference to the drawings.

[1.1 Configuration of Information Processing System 10]

Figure 1:
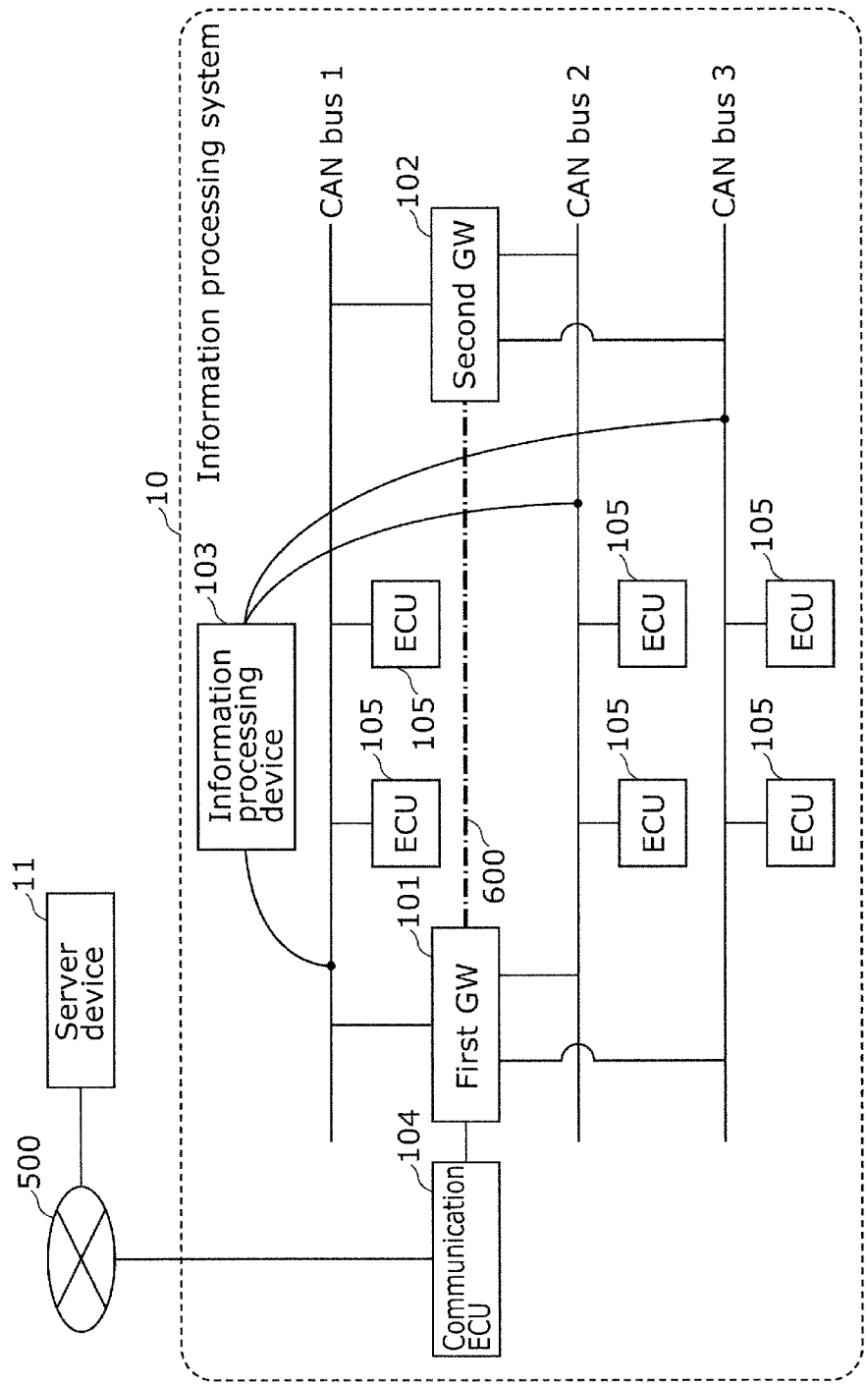
FIG. 1 is a block diagram showing a configuration of an information processing system according to Embodiment 1.

As shown in FIG. 1, an information processing system 10 includes a first gateway (hereinafter, referred to as the first GW) 101, a second gateway (hereinafter, referred to as the second GW) 102, an information processing device 103, a communication ECU 104, and a plurality of ECUs 105.

The information processing system 10 includes a network in which the structural components described above are connected via CAN buses. In an example shown in FIG. 1, each of a CAN bus 1, a CAN bus 2, and a CAN bus 3 is connected to the ECUs 105. Moreover, the CAN bus 1, the CAN bus 2, and the CAN bus 3 (hereinafter, also referred to as the CAN buses 1 to 3) are connected to each other via the first GW 101 and the second GW 102.

Furthermore, the information processing device 103 is connected to the CAN buses 1 to 3. Moreover, in the example shown in FIG. 1, the first GW 101 and the second GW 102 are connected to each other also via a dedicated line 600 which is different from the CAN buses. The dedicated line 600 is used for direct communication between the first GW 101 and the second GW 102.

The information processing system 10 is a network system which is configured on an in-vehicle network, for example. On this in-vehicle network, each of the structural components, such as the ECUs, the GWs, and the information processing device, receives and transmits communication data called a CAN command. With this, the in-vehicle network implements various functions. For example, an advanced driver assistance system (hereinafter, referred to as the ADAS) includes a parking assistance function, a lane keeping assistance function, and a collision avoidance assistance function. To implement these functions, actuators that each operate electronically-controlled steering, acceleration, or breaking are controlled by CAN commands that pass through the in-vehicle network.

Each of the first GW 101 and the second GW 102 has a transfer function of receiving such a CAN command passing through the network and then transmitting (transferring) the received CAN command to a CAN bus designated for an ID (CAN ID) of this CAN command. For example, suppose that the CAN ID of the CAN command received by the first GW 101 from the CAN bus 2 is "0x011" and that a transfer destination previously designated for this CAN ID is the CAN bus 1. In this case, the first GW 101 transfers this CAN command to the CAN bus 1. Designation of transfer destinations of the CAN ID and the CAN command is described later.

Moreover, the first GW 101 connected to the second GW 102 via the dedicated line 600 as described above disables (forcefully terminates) the transfer function in response to a notification transmitted from the second GW 102 via the dedicated line 600.

When receiving a CAN command passing through any of the CAN buses 1 to 3, the information processing device 103 determines whether the received CAN command is normal. When determining that the received CAN command is not normal (i.e., abnormal), the information processing device 103 transmits a predetermined notification to the second GW 102.

Here, the predetermined notification transmitted from the information processing device 103 to the second GW 102 is a notification that brings the information processing system 10 (or, the in-vehicle network) to a state in which the transfer function of the first GW 101 is inactive and the transfer function of the second GW 102 is active. As a specific example, the notification indicates that communication data received by the information processing device 103 is not normal (i.e., abnormal), that the transfer function of the first GW 101 is to be disabled, and that the transfer function of the second GW 102 is to be enabled. In response to this notification, the second GW 102 executes an operation described later.

The communication ECU 104 is disposed on a connection path between the first GW 101 and an external network 500 (such as the Internet). Via the external network 500, the communication ECU 104 transmits and receives communication data to and from a server device 11 that is an external information processing device of the information processing system 10. The information processing device 103 can provide a function that is implemented by a data exchange achieved by being connected to the external information processing device in this way. An example of such a function is a driving assistance function with enhanced accuracy or convenience.

Unfortunately, an interface for such connection to an external source can be used as an intrusion entrance that allows an attacker, such as a hacker, to gain unauthorized access to the information processing system 10. Note, however, that it is extremely technically difficult to completely prevent such unauthorized access obtainable via the interface. On this account, to enhance security of the information processing system 10, a technology for preventing occurrence or expansion of damage resulting from an intrusion by an attacker and also for reducing an influence caused by the damage is an absolute necessity. Here, the information processing device 103 and so forth according to the present embodiment also implement such a technology.

Each of the plurality of ECUs 105 receives and transmits a CAN command having a predetermined CAN ID via a corresponding one of the CAN buses 1 to 3 that is connected to this ECU 105.

FIG. 1 shows a time when the information processing system 10 is not under attack or a time before an attack is detected in the information processing system 10 (hereinafter, each of these times is referred to as the "normal time"). At this time, the CAN-command transfer function of the first GW 101 is active, and the CAN-command transfer function of the second GW 102 is inactive. To be more specific, the second GW 102 is in a standby state in which no transfer processing for a CAN command is performed.

For example, suppose that the first GW 101 is hacked by an attacker via the communication ECU 104 and then tampering is performed on a program to be executed by the first GW 101. In this case, the information processing system 10 is brought to a state in which an unauthorized CAN command can be possibly transferred from the first GW 101 that is operated by the attacker.

When determining that the received CAN command is abnormal (i.e., when detecting an unauthorized CAN command), the information processing device 103 transmits the predetermined notification described above to the second GW 102 via one of the CAN buses 1 to 3.

When receiving this notification, the second GW 102 transmits, to the first GW 101 via the dedicated line 600, a notification to disable the transfer function of the first GW 101. Then, the second GW 102 enables the transfer function of the second GW 102. When receiving this notification, the first GW 101 disables the transfer function of the first GW 101. After this, the second GW 102 executes the transfer processing for CAN data to maintain the function of the information processing system 10.

[1.2 Data Frame]

Here, a data frame which is one of data formats used for communication on a network in accordance with a CAN protocol (i.e., CAN communication) is described.

Figure 2:
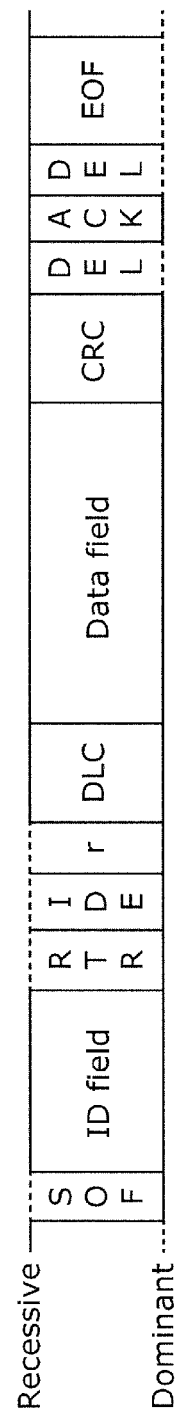
FIG. 2 is a diagram showing a structure of a data frame defined by a CAN protocol.

FIG. 2 is a diagram showing a structure of a data frame defined by the CAN protocol. Among data frames defined by the CAN protocol, the structure of the data frame shown in FIG. 2 is called a standard format. The data frame includes the following fields: a start of frame (SOF); an ID field; a remote transmission request (RTR); an identifier extension (IDE); a reserved bit "r"; a data length code (DLC); a data field, a cyclic redundancy check (CRC) sequence; a CRC delimiter "DEL"; an acknowledgement (ACK) slot; an ACK delimiter "DEL"; and an end of frame (EOF). The following briefly explains the fields which are discussed further below in the description of the present invention.

The ID field is made up of 11 bits and stores an ID that is a value indicating a type of data. This ID corresponds to the CAN ID described above. Moreover, this ID is used for communication arbitration when a plurality of nodes start transmission at the same time. A frame having a higher priority is assigned an ID with a smaller value.

The data field is made up of maximum of 64 bits and stores data. The data length of this field is indicated in the DLC field that is an immediately preceding field.

A CAN command that is transmitted and received by each of the ECUs in the information processing system 10 and is then transferred by the first GW 101 or the second GW 102 is communication data to be stored in the data frame described above. To generate the data frame, the ECU stores data of a specified type into the data field as well as storing a specified CAN ID corresponding to this type of data into the ID field. Requirements on the CAN ID and the corresponding data type and data structure stored in the CAN command in this way are previously determined as in-vehicle network specifications by, for example, a vehicle manufacturer.

It should be noted that the data frames defined by the CAN protocol include another type called an extended format. The extended format also has fields corresponding to the fields briefly explained above. The present invention is applicable to data in either format. Furthermore, it should be noted the information processing device and so forth according to the present invention is also applicable to a network used for communication of data in a format different from these formats defined by the CAN protocol. The above explanation on the formats is provided only to facilitate understanding of the present invention and is not intended to limit the present invention.

[1.3 Configuration of First GW 101]

Figures 3, 4:
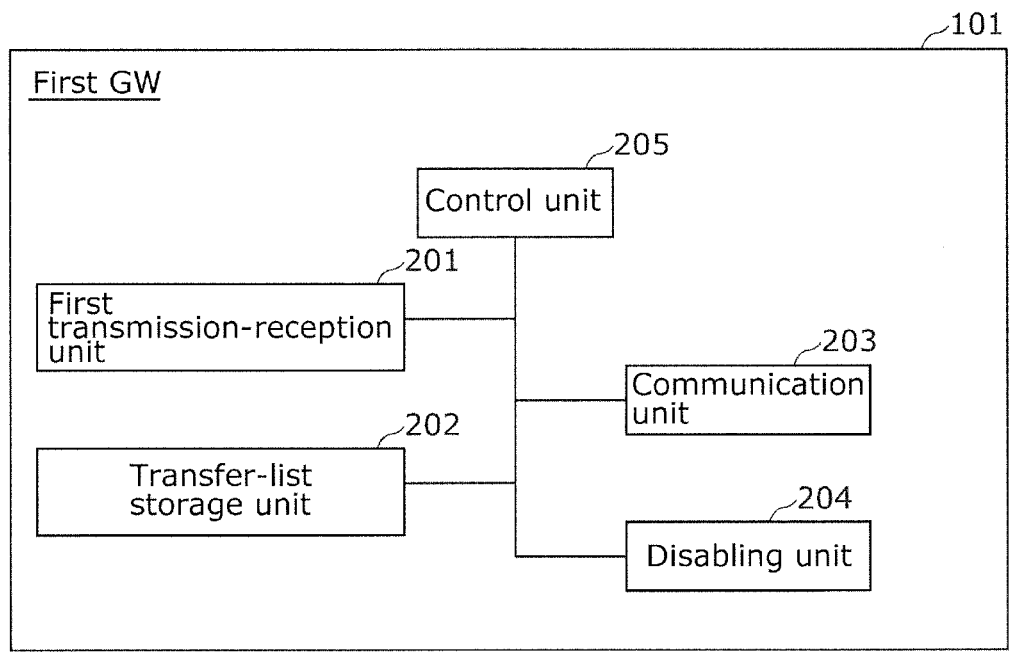
FIG. 3 is a block diagram showing a configuration of a first GW according to Embodiment 1.
FIG. 4 is a diagram showing an example of a data structure of a transfer list according to Embodiment 1.

Next, a configuration of the first GW 101 is described in detail. FIG. 3 is a block diagram showing a function configuration of the first GW 101.

As shown in FIG. 3, the first GW 101 includes, as function blocks, a first transmission-reception unit 201, a transfer-list storage unit 202, a communication unit 203, a disabling unit 204, and a control unit 205.

Although not specifically illustrated, the first GW 101 is provided with a microprocessor which is an arithmetic processing device and a storage device, such as a random access memory (RAM), a read-only memory (ROM), or a hard disk. The RAM, the ROM, or the hard disk stores a computer program. The microprocessor operates according to this computer program, thereby allowing the first GW 101 to perform the function.

It should be noted that the first transmission-reception unit 201, the transfer-list storage unit 202, the communication unit 203, the disabling unit 204, and the control unit 205 of the first GW 101 are typically implemented as an LSI which is an integrated circuit. These function blocks may be implemented by individual chips. Alternatively, some or all of the function blocks may be implemented by a single chip. Alternatively, any one of the function blocks may be implemented by a plurality of chips.

Although the integrated circuit implementing these function blocks is referred to as the LSI here, the integrated circuit may be referred to as an IC, a system LSI, a super LSI, or an ultra LSI depending on the scale of integration.

It is also possible to use a Field Programmable Gate Array (FPGA) that can be programmed after being manufactured, or a programmable logic device such as a reconfigurable processor in which connection and setting of circuit cells can be reconfigured.

Moreover, a method of implementation of the function blocks using an integrated circuit is not limited to application of an LSI. The function blocks may be implemented by a dedicated circuit or a general purpose processor.

Furthermore, when a circuit integration technology that replaces LSIs comes along owing to advances of the semi-conductor technology or to a separate derivative technology, the function blocks should be understandably integrated using that technology. There can be a possibility of adaptation of biotechnology, for example.

Moreover, each of the function blocks may be implemented as a software program or a combination of an LSI and a software program. Here, the software program may be tamper resistant.

The following describes the function blocks of the first GW 101.

[1] First Transmission-Reception Unit 201

The first transmission-reception unit 201 receives a CAN command passing through the CAN bus and transmits a CAN command to the CAN bus. Moreover, the first transmission-reception unit 201 determines the CAN bus which is a transfer destination of the received CAN command, on the basis of a list stored in the transfer-list storage unit 202 described later. Then, the first transmission-reception unit 201 performs transfer processing to transmit the CAN command to the determined CAN bus. The transfer function of the first GW 101 is provided by the first transmission-reception unit 201 that executes this transfer processing.

[2] Transfer-List Storage Unit 202

The transfer-list storage unit 202 stores a transfer list that shows, in a pair, a CAN ID included in a CAN command and a CAN bus designated as a transfer destination of the CAN command that includes the CAN ID. An example of a data structure of the transfer list is shown in FIG. 4.

In the example shown in FIG. 4, a CAN ID and a designated transfer destination related to this CAN ID are included as a pair in the same row. For example, a transfer destination of a CAN command having a CAN ID of "0x011" is the CAN bus 1, and a transfer destination of a CAN command having a CAN ID of "0x021" is the CAN bus 2.

[3] Communication Unit 203

The communication unit 203 receives and transmits communication data to and from the second GW 102 via the dedicated line 600. For example, the second GW 102 transmits, to the first GW 101 via the dedicated line 600, communication data indicating the notification (instruction) to disable the transfer function of the first GW 101. Then, this communication data is received by the communication unit 203 of the first GW 101.

[4] Disabling Unit 204

When receiving the aforementioned notification from the second GW 102 via the communication unit 203, the disabling unit 204 disables the transfer function of the first GW 101 by causing the first transmission-reception unit 201 to stop the transfer processing. With this disablement of the transfer function of the first GW 101, an attack to the network by an attacker, or more specifically, transmission of an unauthorized CAN command, is prevented and the security of the information processing system 10 is maintained.

[5] Control Unit 205

The control unit 205 manages and controls the function blocks described in [1] to [4] above to implement the function of the first GW 101.

[1.4 Configuration of Second GW 102]

Figure 5:
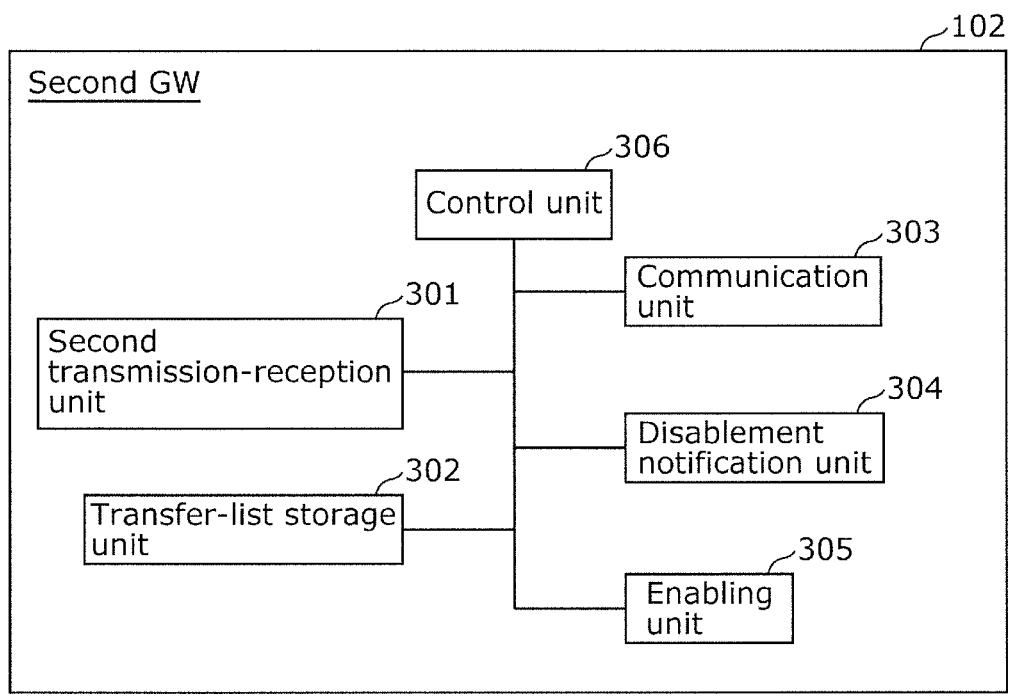
FIG. 5 is a block diagram showing a configuration of a second GW according to Embodiment 1.

Next, a configuration of the second GW 102 is described in detail. FIG. 5 is a block diagram showing a function configuration of the second GW 102.

As shown in FIG. 5, the second GW 102 includes, as function blocks, a second transmission-reception unit 301, a transfer-list storage unit 302, a communication unit 303, a disablement notification unit 304, an enabling unit 305, and a control unit 306.

Although not specifically illustrated, the second GW 102 is provided with a microprocessor which is an arithmetic processing device and a storage device, such as a RAM, a ROM, or a hard disk. The RAM, the ROM, or the hard disk stores a computer program. The microprocessor operates according to this computer program, thereby allowing the second GW 102 to perform the function.

It should be noted that the second transmission-reception unit 301, the transfer-list storage unit 302, the communication unit 303, the disablement notification unit 304, the enabling unit 305, and the control unit 306 of the second GW 102 are typically implemented as an LSI which is an integrated circuit. These function blocks may be implemented by individual chips. Alternatively, some or all of the function blocks may be implemented by a single chip. Alternatively, any one of the function blocks may be implemented by a plurality of chips.

Although the integrated circuit implementing these function blocks is referred to as the LSI here, the integrated circuit may be referred to as an IC, a system LSI, a super LSI, or an ultra LSI depending on the scale of integration.

It is also possible to use a FPGA that can be programmed after being manufactured, or a programmable logic device such as a reconfigurable processor in which connection and setting of circuit cells can be reconfigured.

Moreover, a method of implementation of the function blocks using an integrated circuit is not limited to application of an LSI. The function blocks may be implemented by a dedicated circuit or a general purpose processor.

Furthermore, when a circuit integration technology that replaces LSIs comes along owing to advances of the semiconductor technology or to a separate derivative technology, the function blocks should be understandably integrated using that technology. There can be a possibility of adaptation of biotechnology, for example.

Moreover, each of the function blocks may be implemented as a software program or a combination of an LSI and a software program. Here, the software program may be tamper resistant.

The following describes the function blocks of the second GW 102.

[1] Second Transmission-Reception Unit 301

The second transmission-reception unit 301 receives a CAN command passing through the CAN bus and transmits a CAN command to the CAN bus. Moreover, the second transmission-reception unit 301 determines the CAN bus which is a transfer destination of the received CAN command, on the basis of a list stored in the transfer-list storage unit 302 described later. Then, the second transmission-reception unit 301 performs transfer processing to transmit the CAN command to the determined CAN bus. The transfer function of the second GW 102 is provided by the second transmission-reception unit 301 that executes this transfer processing. However, in the normal time in which no attack is detected in the information processing system 10, this transfer processing of the second transmission-reception unit 301 is inactive (hereinafter, this inactive state may also be referred to as the "standby state").

[2] Transfer-List Storage Unit 302

The transfer-list storage unit 302 stores a transfer list that shows, in a pair, a CAN ID included in a CAN command and a CAN bus designated as a transfer destination of the CAN command that includes the CAN ID. An example of the transfer list included in the second GW 102 is the same as that shown in FIG. 4. Thus, the description of the transfer list is omitted here.

[3] Communication Unit 303

The communication unit 303 receives and transmits communication data to and from the first GW 101 via the dedicated line 600. For example, the communication unit 303 transmits, to the first GW 101 via the dedicated line 600, communication data indicating the notification (instruction) to disable the transfer function of the first GW 101. Then, this communication data is received by the communication unit 203 of the first GW 101.

[4] Disablement Notification Unit 304

The disablement notification unit 304 receives the predetermined notification described above from the information processing device 103 via the second transmission-reception unit 301. In response to this, the communication unit 303 transmits, to the first GW 101 via the dedicated line 600, the communication data indicating the notification (instruction) to disable the transfer function of the first GW 101.

[5] Enabling Unit 305

The enabling unit 305 receives the predetermined notification described above from the information processing device 103 via the second transmission-reception unit 301. In response to this, the enabling unit 305 enables the transfer function of the second GW 102 (i.e., cancels the standby state) by causing the second transmission-reception unit 301 to start the transfer processing. Thus, even when the transfer function of the first GW 101 is disabled, this enablement of the transfer function of the second GW 102 allows CAN commands for, for example, electronic control to continue to be transferred on the network. Hence, the function of the information processing system 10 is maintained.

[6] Control Unit 306

The control unit 306 manages and controls the function blocks described in [1] to [5] above to implement the function of the second GW 102.

[1.5 Configuration of Information Processing Device 103]

Figure 6:
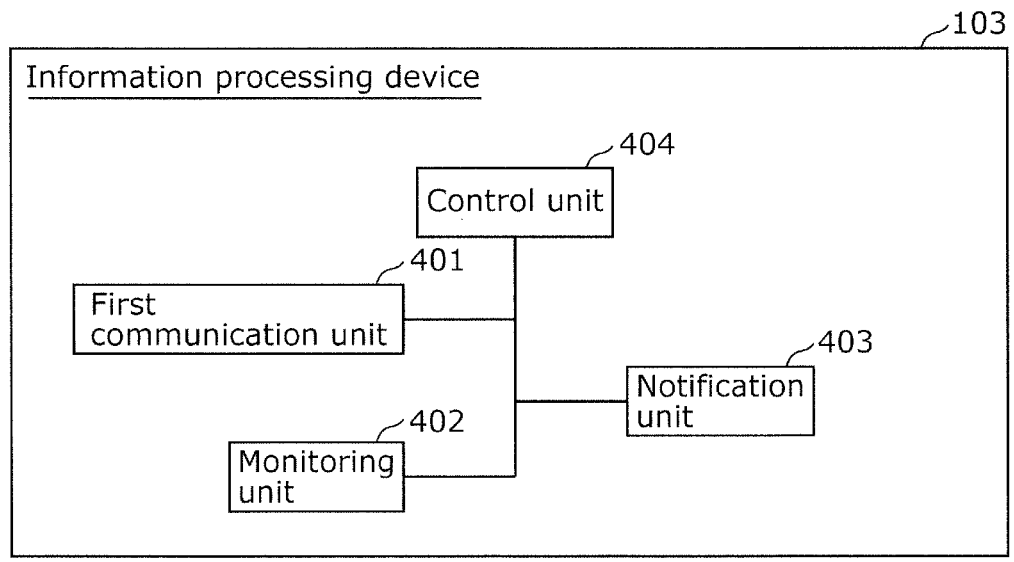
FIG. 6 is a block diagram showing a configuration of an information processing device according to Embodiment 1.

Next, a configuration of the information processing device 103 is described in detail. FIG. 6 is a block diagram showing a function configuration of the information processing device 103.

As shown in FIG. 6, the information processing device 103 includes, as function blocks, a first communication unit 401, a monitoring unit 402, a notification unit 403, and a control unit 404.

Although not specifically illustrated, the information processing device 103 is provided with a microprocessor which is an arithmetic processing device and a storage device, such as a random access memory (RAM), a read-only memory (ROM), or a hard disk. The RAM, ROM, or hard disk stores a computer program. The microprocessor operates according to this computer program, thereby allowing the information processing device 103 to perform the function.

It should be noted that the first communication unit 401, the monitoring unit 402, the notification unit 403, and the control unit 404 of the information processing device 103 are typically implemented as an LSI which is an integrated circuit. These function blocks may be implemented by individual chips. Alternatively, some or all of the function blocks may be implemented by a single chip. Alternatively, any one of the function blocks may be implemented by a plurality of chips.

Although the integrated circuit implementing these function blocks is referred to as the LSI here, the integrated circuit may be referred to as an IC, a system LSI, a super LSI, or an ultra LSI depending on the scale of integration.

It is also possible to use a FPGA that can be programmed after being manufactured, or a programmable logic device such as a reconfigurable processor in which connection and setting of circuit cells can be reconfigured.

Moreover, a method of implementation of the function blocks using an integrated circuit is not limited to application of an LSI. The function blocks may be implemented by a dedicated circuit or a general purpose processor.

Furthermore, when a circuit integration technology that replaces LSIs comes along owing to advances of the semiconductor technology or to a separate derivative technology, the function blocks should be understandably integrated using that technology. There can be a possibility of adaptation of biotechnology, for example.

Moreover, each of the function blocks may be implemented as a software program or a combination of an LSI and a software program. Here, the software program may be tamper resistant.

The information processing device 103 as described above is included in the information processing system 10 which is implemented as, for example, an in-vehicle network. Here, the information processing device 103 is implemented as an ECU that is used for monitoring and that is connected to all the CAN buses of this in-vehicle network.

The following describes the function blocks of the information processing device 103.

[1] First Communication Unit 401

The first communication unit 401 receives a CAN command passing through the CAN bus, and transmits a CAN command to the CAN bus.

[2] Monitoring Unit 402

The monitoring unit 402 receives, via the first communication unit 401, a CAN command passing through the plurality of CAN buses (the CAN buses 1 to 3 in the example shown in FIG. 1) connected to the information processing device 103. Then, the monitoring unit 402 determines whether the received CAN command is normal. As a method of determining whether the CAN command is normal, any known method can be used. For example, whether the CAN command is normal can be determined by whether the data length indicated in the DLC field of the CAN command matches the length of the data field. As another example, whether the CAN command is normal can be determined by whether the type of data, or more specifically, a value of the data field determined depending on the CAN ID, or transmission timing is within a specified range.

[3] Notification Unit 403

Suppose that the monitoring unit 402 determines that the CAN command received by the first communication unit 401 is not normal (i.e., abnormal). In this case, the notification unit 403 transmits the predetermined notification described above to the second GW 102 via the first communication unit 401.

[4] Control Unit 404

The control unit 404 manages and controls the function blocks described in [1] to [3] above to implement the function of the information processing device 103.

[1.6 Operation of Information Processing System 10]

Figure 7:
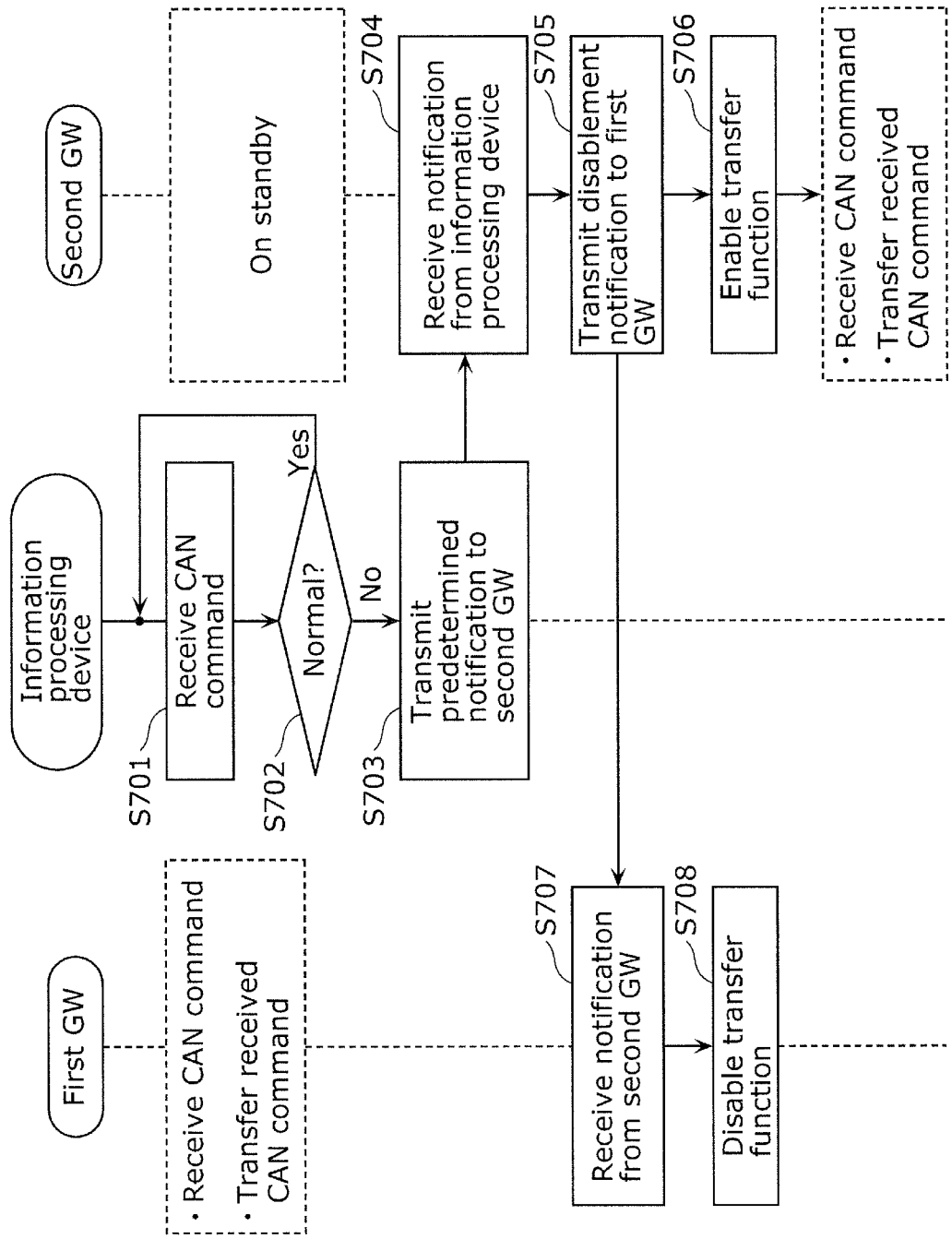
FIG. 7 is a sequence diagram illustrating an operation performed by the information processing system according to Embodiment 1.

Suppose that it is determined in the information processing system 10 that the CAN command received by the information processing device 103 is not normal. In this case, the transfer function of the first GW 101 is disabled, and the second GW 102 is caused, as an alternative, to perform the transfer function. An example of this operation is described, with reference to FIG. 7. FIG. 7 is a sequence diagram illustrating the operation performed by the information processing system 10.

In an initiation stage in this example of the operation of the information processing system 10, the first GW 101 performs the transfer processing for the CAN command that is the communication data passing through the network and the second GW 102 is in the standby state.

The first communication unit 401 of the information processing device 103 receives a CAN command from the CAN bus connected to the first communication unit 401 (Step S701).

The monitoring unit 402 determines whether the CAN command received by the first communication unit 401 is normal (Step S702). When it is determined that the CAN command is normal (Yes in Step S702), the procedure of this operation performed by the information processing device 103 returns to the reception of a CAN command (Step S701). Then, the first communication unit 401 receives a next CAN command.

While the monitoring unit 402 is continuously determining that the CAN commands received one after another are normal, the first GW 101 continues to transfer the received CAN commands and the second GW 102 continues to be in the standby state.

When the monitoring unit 402 determines that the received CAN command is not normal (No in Step S702), the notification unit 403 transmits, to the second GW 102 via the first communication unit 401, the predetermined notification to disable the transfer function of the first GW 101 and enable the transfer function of the second GW 102 (Step S703).

The second transmission-reception unit 301 of the second GW 102 receives the aforementioned notification from the information processing device 103 (Step S704). Then, the disablement notification unit 304 causes the communication unit 303 to transmit, to the first GW 101, the notification to disable the CAN-command transfer function of the first GW 101 (Step S705).

Moreover, the enabling unit 305 of the second GW 102 causes the second transmission-reception unit 301 to start the transfer processing, thereby the transfer function of the second GW 102 is enabled (Step S706), and the second GW 102 starts transferring of CAN commands. After this, the second GW 102 receives the CAN command and the second transmission-reception unit 301 performs the transfer processing by which the received CAN command is transmitted to the CAN bus that is the transfer destination determined based on the transfer-list stored in the transfer-list storage unit 302.

The communication unit 203 of the first GW 101 receives, from the second GW 102, the notification to disable the CAN-command transfer function of the first GW 101 (Step S707). In response to this, the disabling unit 204 causes the first transmission-reception unit 201 to stop the transfer processing, thereby the CAN-command transfer function of the first GW 101 is disabled (Step S708).

According to the present embodiment described thus far, the information processing system 10 includes the first GW 101, the second GW 102, and the information processing device 103 which are connected via the CAN buses 1 to 3. Moreover, the first GW 101 and the second GW 102 are connected via the dedicated line 600. When it is determined in the information processing device 103 that the received CAN command is not normal, the information processing device 103 transmits, to the second GW 102 via the CAN bus, the predetermined notification corresponding to the abnormality of the received CAN command. When receiving this notification, the second GW 102 transmits, to the first GW 101 via the dedicated line 600, the notification to disable the transfer function of the first GW 101 and also enables the transfer function of the second GW 102. After this, the transfer processing for the communication data is performed by the second GW 102 having the active transfer function in the information processing system 10. Hence, the function of the information processing system 10 is maintained.

The notification to disable the transfer function as described above is transmitted via the dedicated line 600 safely and reliably. With this, the information processing system 10 that has redundancy to support functional safety and security can be provided.

Embodiment 2

Hereinafter, an information processing system according to Embodiment 2 of the present invention is described, with reference to the drawings.

[2.1 Configuration of Information Processing System 80]

Figure 8:
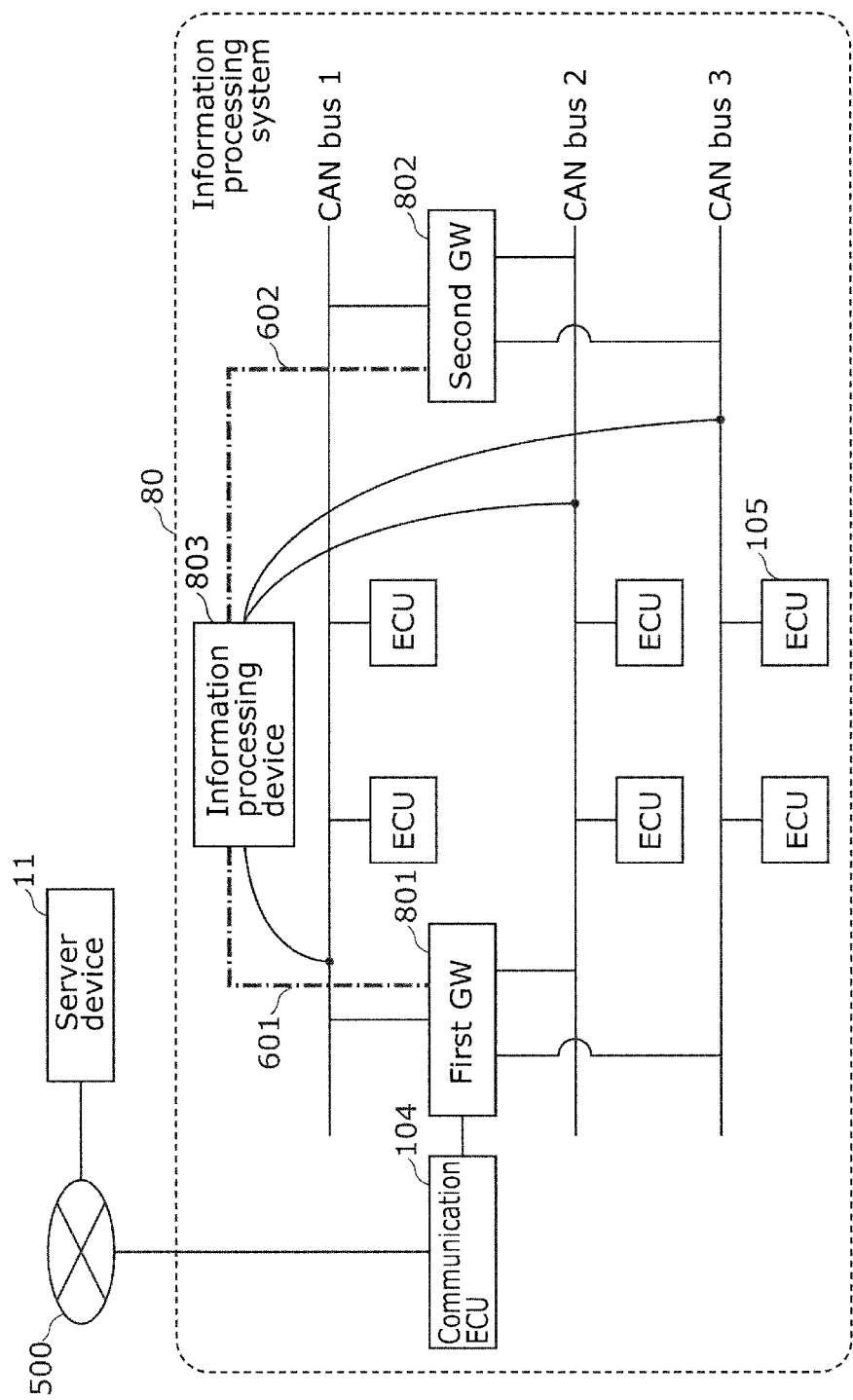
FIG. 8 is a block diagram showing a configuration of an information processing system according to Embodiment 2.

As shown in FIG. 8, an information processing system 80 includes a first gateway (hereinafter, referred to as the first GW) 801, a second gateway (hereinafter, referred to as the second GW) 802, an information processing device 803, a communication ECU 104, and a plurality of ECUs 105.

The information processing system 80 includes a network in which the structural components described above are connected via CAN buses. In an example shown in FIG. 8, each of a CAN bus 1, a CAN bus 2, and a CAN bus 3 is connected to the ECUs 105. Moreover, the CAN bus 1, the CAN bus 2, and the CAN bus 3 (hereinafter, also referred to as the CAN buses 1 to 3) are connected to each other via the first GW 801 and the second GW 802.

Furthermore, in the example shown in FIG. 8, the first GW 801 and the information processing device 803 are connected to each other also via a dedicated line 601 which is different from the CAN buses. The dedicated line 601 is used for direct communication between the information processing device 803 and the first GW 801. Moreover, the second GW 802 and the information processing device 803 are connected to each other also via a dedicated line 602 which is different from the CAN buses. The dedicated line 602 is used for direct communication between the information processing device 803 and the second GW 802. It should be noted that the dedicated line 601 is an example of a second dedicated line and a third dedicated line according to the present embodiment. Note also that the dedicated line 602 is an example of a first dedicated line and a fourth dedicated line according to the present embodiment.

As with the information processing system 10 according to Embodiment 1, the information processing system 80 is also an in-vehicle network, for example. On this in-vehicle network, each of the structural components, such as the ECUs, the GWs, and the information processing device, receives and transmits communication data called a CAN command. With this, the in-vehicle network implements various functions. Note that a CAN command used in the information processing system 80 is communication data in a data frame as described in Embodiment 1 and thus description of the CAN command is omitted here.

Each of the first GW 801 and the second GW 802 has a transfer function of receiving such a CAN command passing through the network and then transmitting (transferring) the received CAN command to a CAN bus designated for an ID (CAN ID) of this CAN command. For example, suppose that the CAN ID of the CAN command received by the first GW 801 from the CAN bus 2 is "0x011" and that a transfer destination designated for this CAN ID is the CAN bus 1. In this case, the first GW 801 transfers this CAN command to the CAN bus 1. Details on designation of transfer destinations of the CAN ID and the CAN command are the same as those described in Embodiment 1, and thus description of the details is omitted here.

Moreover, the first GW 801 connected to the information processing device 803 via the dedicated line 601 as described above disables (forcefully terminates) the transfer function in response to a notification transmitted from the information processing device 803 via the dedicated line 601. Similarly, the second GW 802 connected to the information processing device 803 via the dedicated line 602 enables the transfer function (returns from a standby state) in response to a notification transmitted from the information processing device 803 via the dedicated line 602.

When receiving a CAN command passing through any of the CAN buses 1 to 3, the information processing device 803 determines whether the received CAN command is normal. When determining that the received CAN command is not normal (i.e., abnormal), the information processing device 803 transmits, to the first GW 801 via the dedicated line 601, a predetermined notification to disable the transfer function of the first GW 801. Moreover, the information processing device 803 transmits, to the second GW 802 via the dedicated line 602, a predetermined notification to enable the transfer function of the second GW 802.

Here, the predetermined notification transmitted from the information processing device 803 to the first GW 801 indicates, for example, that the communication data received by the information processing device 803 is not normal (i.e., abnormal). Moreover, this predetermined notification indicates that the transfer function of the first GW 801 is disabled or that the transfer function of the second GW 802 is enabled. In response to this notification, the first GW 801 executes an operation described later.

Furthermore, the predetermined notification transmitted from the information processing device 803 to the second GW 802 indicates, for example, that the communication data received by the information processing device 803 is not normal (i.e., abnormal). Moreover, this predetermined notification indicates that the transfer function of the second GW 802 is enabled or that the transfer function of the first GW 801 is disabled. In response to this notification, the second GW 802 executes an operation described later.

The communication ECU 104 and the plurality of ECUs 105 are the same as those in Embodiment 1, and thus descriptions of these components are omitted here. Here, as in Embodiment 1, the information processing device 803 and so forth according to the present invention are also conceived to enhance security of the information processing system 80. Thus, the information processing device 803 and so forth also implement the technology that prevents occurrence or expansion of damage resulting from an intrusion into the information processing system 80 by an attacker and that also reduces an influence caused by the damage.

FIG. 8 shows a normal time when the information processing system 80 is not under attack (or before an attack is detected). At this time, the CAN-command transfer function of the first GW 801 is active, and the CAN-command transfer function of the second GW 802 is inactive. To be more specific, the second GW 802 is in the standby state in which no transfer processing for a CAN command is performed.

For example, suppose that the first GW 801 is hacked by an attacker via the communication ECU 104 and then tampering is performed on a program to be executed by the first GW 801. In this case, the information processing system 80 is brought to a state in which an unauthorized CAN command can be possibly transferred from the first GW 801 that is operated by the attacker.

Suppose that it is determined that the received CAN command is abnormal (i.e., that an unauthorized CAN command is detected). In this case, the information processing device 803 transmits, to the first GW 801 via the dedicated line 601, the notification to disable the transfer function of the first GW 801. Moreover, the information processing device transmits, to the second GW 802 via the dedicated line 602, the notification to enable the transfer function of the second GW 802.

When receiving this notification from the information processing device 803, the first GW 801 disables the transfer function of the first GW 801. Moreover, when receiving this notification from the information processing device 803, the second GW 802 enables the transfer function of the second GW 802. After this, the transfer processing for the communication data is performed by the second GW 802 having the active transfer function in the information processing system 80. Hence, the function of the information processing system 80 is maintained.

[2.2 Configuration of First GW 801]

Figure 9:
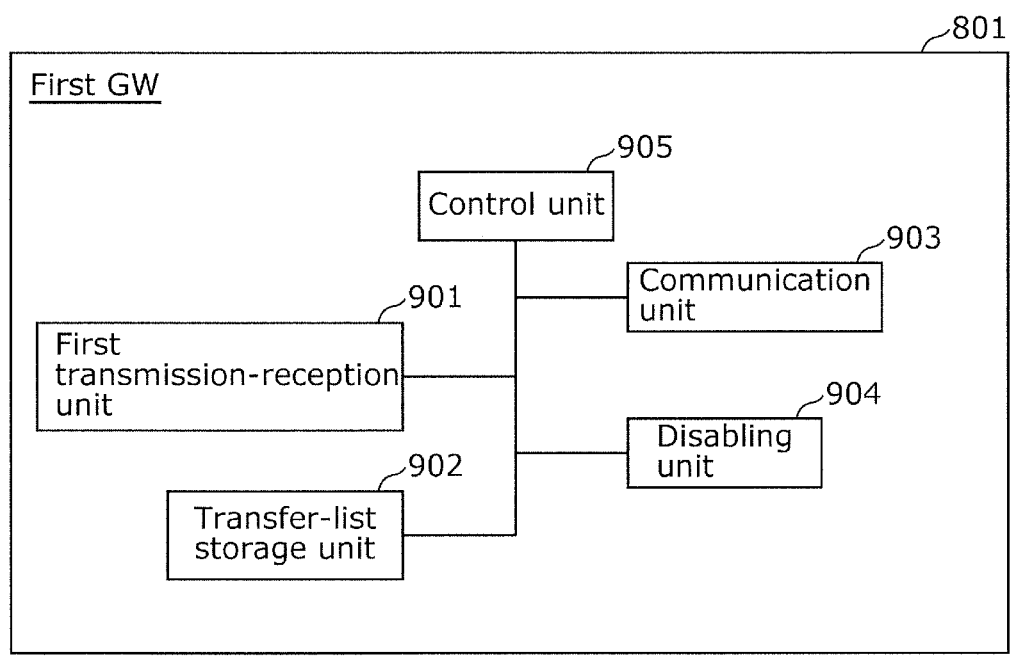
FIG. 9 is a block diagram showing a configuration of a first GW according to Embodiment 2.

Next, the configuration of the first GW 801 is described in detail. FIG. 9 is a block diagram showing a function configuration of the first GW 801.

As shown in FIG. 9, the first GW 801 includes, as function blocks, a first transmission-reception unit 901, a transfer-list storage unit 902, a communication unit 903, a disabling unit 904, and a control unit 905.

Although not specifically illustrated, the first GW 801 is provided with a microprocessor which is an arithmetic processing device and a storage device, such as a RAM, a ROM, or a hard disk. The RAM, the ROM, or the hard disk stores a computer program. The microprocessor operates according to this computer program, thereby allowing the first GW 801 to perform the function.

It should be noted that the first transmission-reception unit 901, the transfer-list storage unit 902, the communication unit 903, the disabling unit 904, and the control unit 905 of the first GW 801 are typically implemented as an LSI which is an integrated circuit. These function blocks may be implemented by individual chips. Alternatively, some or all of the function blocks may be implemented by a single chip. Alternatively, any one function blocks may be implemented by a plurality of chips.

Although the integrated circuit implementing these function blocks is referred to as the LSI here, the integrated circuit may be referred to as an IC, a system LSI, a super LSI, or an ultra LSI depending on the scale of integration.

It is also possible to use a Field Programmable Gate Array (FPGA) that can be programmed after being manufactured, or a programmable logic device such as a reconfigurable processor in which connection and setting of circuit cells can be reconfigured.

Moreover, a method of implementation of the function blocks using an integrated circuit is not limited to application of an LSI. The function blocks may be implemented by a dedicated circuit or a general purpose processor.

Furthermore, when a circuit integration technology that replaces LSIs comes along owing to advances of the semiconductor technology or to a separate derivative technology, the function blocks should be understandably integrated using that technology. There can be a possibility of adaptation of biotechnology, for example.

Moreover, each of the function blocks may be implemented as a software program or a combination of an LSI and a software program. Here, the software program may be tamper resistant.

The following describes the function blocks of the first GW 801.

[1] First Transmission-Reception Unit 901

The first transmission-reception unit 901 receives a CAN command passing through the CAN bus and transmits a CAN command to the CAN bus. Moreover, the first transmission-reception unit 901 determines the CAN bus which is a transfer destination of the received CAN command, on the basis of a list stored in the transfer-list storage unit 902 described later. Then, the first transmission-reception unit 901 performs transfer processing to transmit the CAN command to the determined CAN bus. The transfer function of the first GW 801 is provided by the first transmission-reception unit 901 that executes this transfer processing.

[2] Transfer-List Storage Unit 902

The transfer-list storage unit 902 stores a transfer list that shows, in a pair, a CAN ID included in a CAN command and a CAN bus designated as a transfer destination of the CAN command that includes the CAN ID. An example of the transfer list included in the first GW 801 is the same as that shown in FIG. 4. Thus, the description of the transfer list is omitted here.

[3] Communication Unit 903

The communication unit 903 receives and transmits communication data to and from the information processing device 803 via the dedicated line 601. For example, the information processing device 803 transmits, to the first GW 801 via the dedicated line 601, communication data indicating the notification (instruction) to disable the transfer function of the first GW 801. Then, this communication data is received by the communication unit 903 of the first GW 801.

[4] Disabling Unit 904

When receiving the aforementioned notification from the information processing device 803 via the communication unit 903, the disabling unit 904 disables the transfer function of the first GW 801 by causing the first transmission-reception unit 901 to stop the transfer processing. With this disablement of the transfer function of the first GW 801, an attack to the network by an attacker, or more specifically, transmission of an unauthorized CAN command, is prevented and the security of the information processing system 80 is maintained.

[5] Control Unit 905

The control unit 905 manages and controls the function blocks described in [1] to [4] above to implement the function of the first GW 801.

[2.3 Configuration of Second GW 802]

Figure 10:
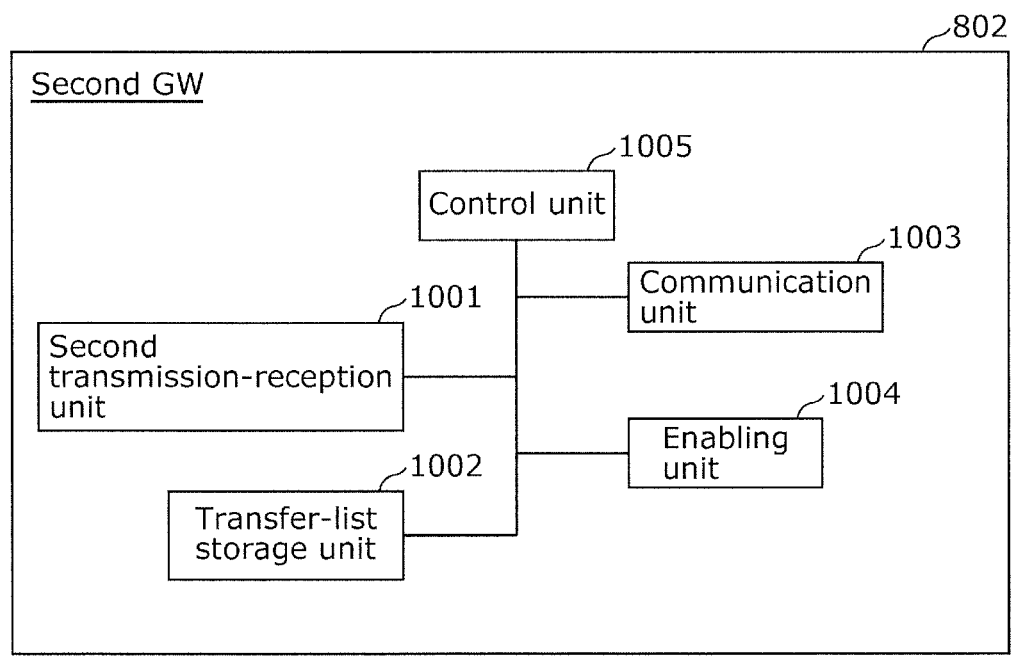
FIG. 10 is a block diagram showing a configuration of a second GW according to Embodiment 2.

Next, a configuration of the second GW 802 is described in detail. FIG. 10 is a block diagram showing a function configuration of the second GW 802.

As shown in FIG. 10, the second GW 802 includes, as function blocks, a second transmission-reception unit 1001, a transfer-list storage unit 1002, a communication unit 1003, an enabling unit 1004, and a control unit 1005.

Although not specifically illustrated, the second GW 802 is provided with a microprocessor which is an arithmetic processing device and storage device, such as a RAM, a ROM, or a hard disk. The RAM, the ROM, or the hard disk stores a computer program. The microprocessor operates according to this computer program, thereby allowing the second GW 802 to perform the function.

It should be noted that the second transmission-reception unit 1001, the transfer-list storage unit 1002, the communication unit 1003, the enabling unit 1004, and the control unit 1005 of the second GW 802 are typically implemented as an LSI which an integrated circuit. These function blocks may be implemented by individual chips. Alternatively, some or all of the function blocks may be implemented by a single chip. Alternatively, any one of the function blocks may be implemented by a plurality of chips.

Although the integrated circuit implementing these function blocks is referred to as the LSI here, the integrated circuit may be referred to as an IC, a system LSI, a super LSI, or an ultra LSI depending on the scale of integration.

It is also possible to use a FPGA that can be programmed after being manufactured, or a programmable logic device such as a reconfigurable processor in which connection and setting of circuit cells can be reconfigured.

Moreover, a method of implementation of the function blocks using an integrated circuit is not limited to application of an LSI. The function blocks may be implemented by a dedicated circuit or a general purpose processor.

Furthermore, when a circuit integration technology that replaces LSIs comes along owing to advances of the semiconductor technology or to a separate derivative technology, the function blocks should be understandably integrated using that technology. There can be a possibility of adaptation of biotechnology, for example.

Moreover, each of the function blocks may be implemented as a software program or a combination of an LSI and a software program. Here, the software program may be tamper resistant.

[1] Second Transmission-Reception Unit 1001

The second transmission-reception unit 1001 receives a CAN command passing through the CAN bus and transmits a CAN command to the CAN bus. Moreover, the second transmission-reception unit 1001 determines the CAN bus which is a transfer destination of the received CAN command, on the basis of a list stored in the transfer-list storage unit 1002 described later. Then, the second transmission-reception unit 1001 performs transfer processing to transmit the CAN command to the determined CAN bus. The transfer function of the second GW 802 is provided by the second transmission-reception unit 1001 that executes this transfer processing. However, in the normal time in which no attack is detected in the information processing system 80, this transfer processing of the second transmission-reception unit 1001 is inactive. To be more specific, in the normal time, the second GW 802 is in the standby state in which the function for transferring the CAN command is inactive.

[2] Transfer-List Storage Unit 1002

The transfer-list storage unit 1002 stores a transfer list that shows, in a pair, a CAN ID included in a CAN command and a CAN bus designated as a transfer destination of the CAN command that includes the CAN ID. An example of the transfer list included in the second GW 802 is the same as that shown in FIG. 4. Thus, the description of the transfer list is omitted here.

[3] Communication Unit 1003

The communication unit 1003 receives and transmits communication data to and from the information processing device 803 via the dedicated line 602. For example, the information processing device 803 transmits, to the second GW 802 via the dedicated line 602, communication data indicating the notification (instruction) to enable the transfer function of the second GW 802. Then, this communication data is received by the communication unit 1003 of the second GW 802.

[4] Enabling Unit 1004

The enabling unit 1004 receives the notification described above from the information processing device 803 via the communication unit 1003. In response to this, the enabling unit 1004 enables the transfer function of the second GW 802 (i.e., cancels the standby state) by causing the second transmission-reception unit 1001 to start the transfer processing. Thus, even when the transfer function of the first GW 801 is disabled, this enablement of the transfer function of the second GW 802 allows CAN commands for, for example, electronic control to continue to be transferred on the network. Hence, the function of the information processing system 80 is maintained.

[5] Control Unit 1005

The control unit 1005 manages and controls the function blocks described in [1] to [4] above to implement the function of the second GW 802.

[2.4 Configuration of Information Processing Device 803]

Figure 11:
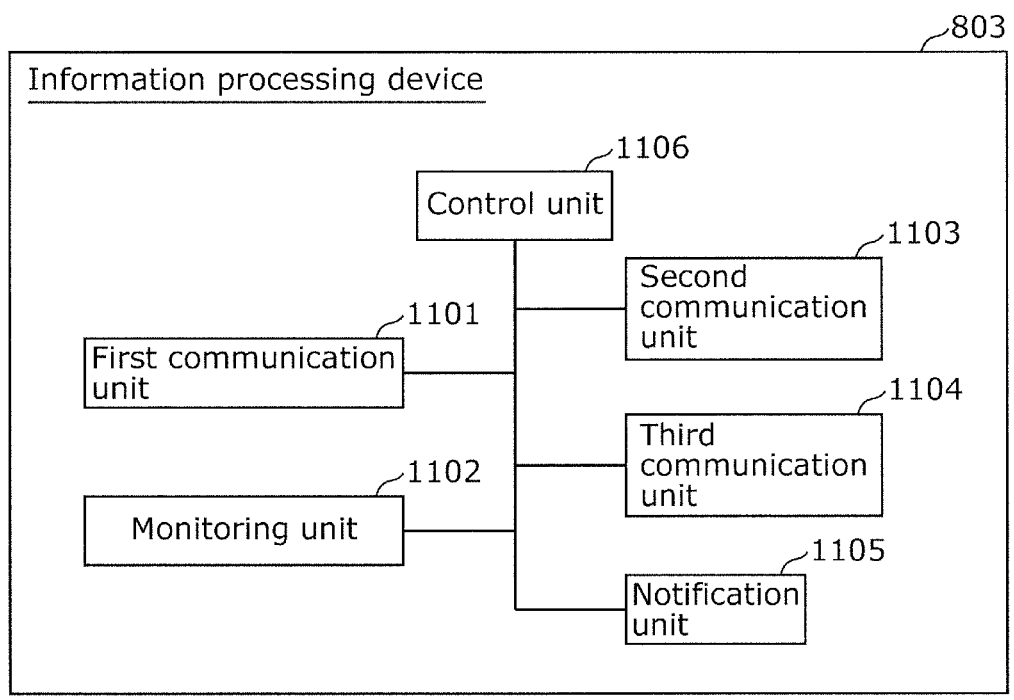
FIG. 11 is a block diagram showing a configuration of an information processing device according to Embodiment 2.

Next, a configuration of the information processing device 803 is described in detail. FIG. 11 is a block diagram showing a function configuration of the information processing device 803.

As shown in FIG. 11, the information processing device 803 includes a first communication unit 1101, a monitoring unit 1102, a second communication unit 1103, a third communication unit 1104, a notification unit 1105, and a control unit 1106.

Although not specifically illustrated, the information processing device 803 is provided with a microprocessor which is an arithmetic processing device and a storage device, such as a RAM, a ROM, or a hard disk. The RAM, the ROM, or the hard disk stores a computer program. The microprocessor operates according to this computer program, thereby allowing the information processing device 803 to perform the function.

It should be noted that the first communication unit 1101, the monitoring unit 1102, the second communication unit 1103, the third communication unit 1104, the notification unit 1105, and the control unit 1106 of the information processing device 803 are typically implemented as an LSI which is an integrated circuit. These function blocks may be implemented by individual chips. Alternatively, some or all of the function blocks may be integrated by a single chip. Alternatively, any one of the function blocks may be implemented by a plurality of chips.

Although the integrated circuit implementing these function blocks is referred to as the LSI here, the integrated circuit may be referred to as an IC, a system LSI, a super LSI, or an ultra LSI depending on the scale of integration.

It is also possible to use a FPGA that can be programmed after being manufactured, or a programmable logic device such as a reconfigurable processor in which connection and setting of circuit cells can be reconfigured.

Moreover, a method of implementation of the function blocks using an integrated circuit is not limited to application of an LSI. The function blocks may be implemented by a dedicated circuit or a general purpose processor.

Furthermore, when a circuit integration technology that replaces LSIs comes along owing to advances of the semiconductor technology or to a separate derivative technology, the function blocks should be understandably integrated using that technology. There can be a possibility of adaptation of biotechnology, for example.

Moreover, each of the function blocks may be implemented as a software program or a combination of an LSI and a software program. Here, the software program may be tamper resistant.

The information processing device 803 as described above is included in the information processing system 80 which is implemented as, for example, an in-vehicle network. Here, the information processing device 803 is implemented as an ECU that is used for monitoring and that is connected to all the CAN buses of this in-vehicle network.

The following describes the function blocks of the information processing device 803.

[1] First Communication Unit 1101

The first communication unit 1101 receives a CAN command passing through the CAN bus, and transmits a CAN command to the CAN bus.

[2] Monitoring Unit 1102

The monitoring unit 1102 receives, via the first communication unit 1101, a CAN command passing through the plurality of CAN buses (the CAN buses 1 to 3 in the example shown in FIG. 8) connected to the information processing device 803. Then, the monitoring unit 1102 determines whether the received CAN command is normal. A method of determining whether the CAN command is normal is the same as the method discussed in the description of the information processing device 103 according to Embodiment 1. Thus, the description of the method is omitted here.

[3] Second Communication Unit 1103

The second communication unit 1103 of the information processing device 803 transmits communication data to the second GW 802 via the dedicated line 601. For example, the second communication unit 1103 of the information processing device 803 transmits, to the first GW 801 via the dedicated line 601, the communication data indicating a notification (instruction) to disable the transfer function of the first GW 801. This communication data is received by the communication unit 903 of the first GW 801.

[4] Third Communication Unit 1104

The third communication unit 1104 of the information processing device 803 transmits communication data to the second GW 802 via the dedicated line 602. For example, the third communication unit 1104 of the information processing device 803 transmits, to the second GW 802 via the dedicated line 602, the communication data indicating a notification (instruction) to enable the transfer function of the second GW 802. This communication data is received by the communication unit 1003 of the second GW 802.

[5] Notification Unit 1105

Suppose that the monitoring unit 1102 determines that the CAN command received by the first communication unit 1101 is not normal (i.e., abnormal). In this case, the notification unit 1105 transmits the respective predetermined notifications to the first GW 801 and the second GW 802. To be more specific, the notification unit 1105 transmits, to the first GW 801 via the second communication unit 1103, the notification to disable the transfer function of the first GW 801. Moreover, the notification unit 1105 transmits, to the second GW 802 via the third communication unit 1104, the notification to enable the transfer function of the second GW 802.

[6] Control Unit 1106

The control unit 1106 manages and controls the function blocks described in [1] to [5] above to implement the function of the information processing device 803.

[2.5 Operation of Information Processing System 80]

Figure 12:
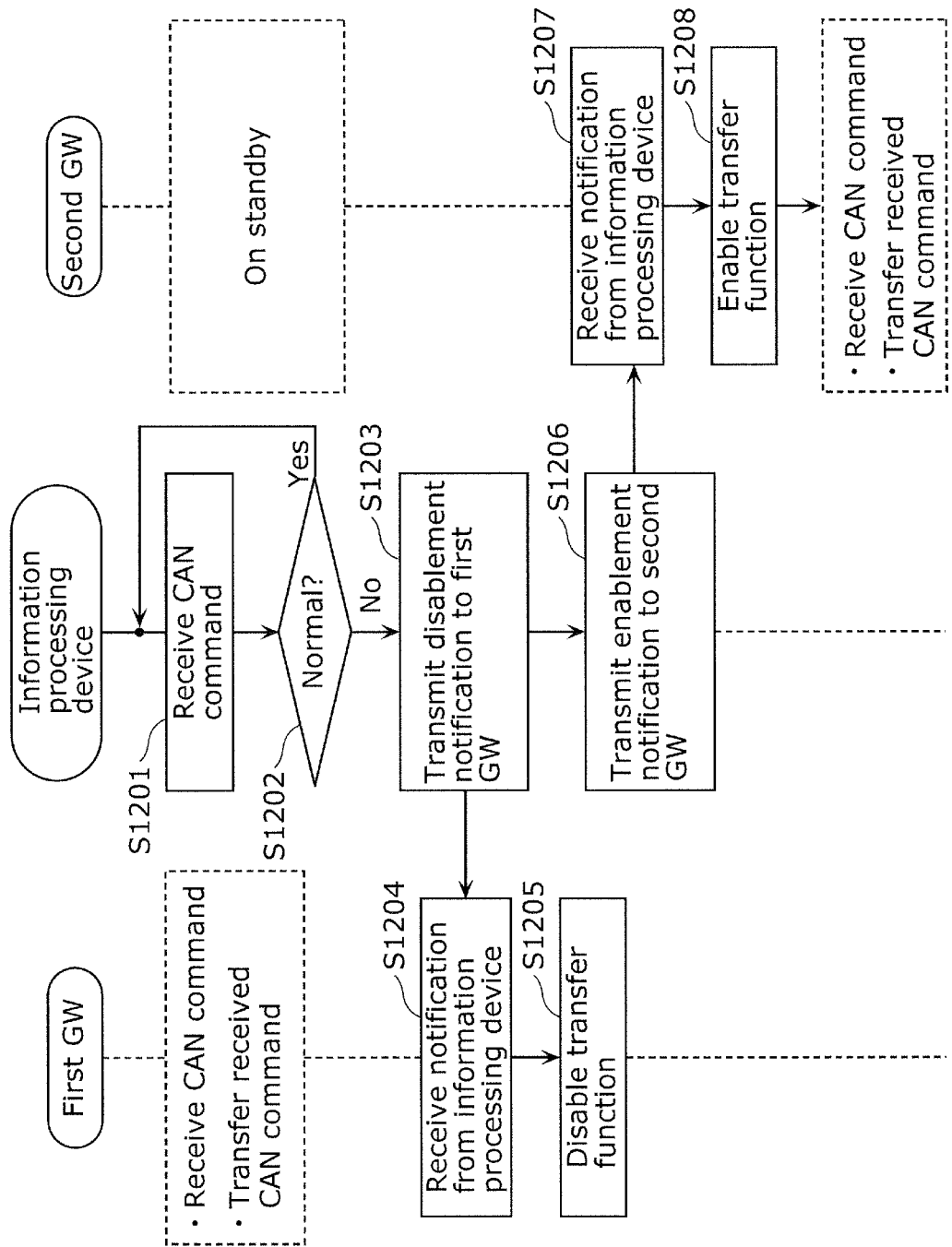
FIG. 12 is a sequence diagram illustrating an operation performed by the information processing system according to Embodiment 2.

Suppose that it is determined in the information processing system 80 that the CAN command received by the information processing device 803 is not normal. In this case, the transfer function of the first GW 801 is disabled, and the second GW 802 is caused, as an alternative, to perform the transfer function. An example of this operation is described, with reference to FIG. 12. FIG. 12 is a sequence diagram illustrating the operation performed by the information processing system 80.

In an initiation stage in this example of the operation of the information processing system 80, the first GW 801 performs the transfer processing for the CAN command that is the communication data passing through the network and the second GW 802 is in the standby state.

The first communication unit 1101 of the information processing device 803 receives a CAN command from the CAN bus connected to the first communication unit 1101 (Step S1201).

The monitoring unit 1102 determines whether the CAN command received by the first communication unit 1101 is normal (Step S1202). When it is determined that the CAN command is normal (Yes in Step S1202), the procedure of this operation performed by the information processing device 803 returns to the reception of a CAN command (Step S1201). Then, the first communication unit 1101 receives a next CAN command.

While the monitoring unit 1102 is continuously determining that the CAN commands received one after another are normal, the first GW 801 continues to transfer the received CAN commands and the second GW 802 continues to be in the standby state.

When the monitoring unit 1102 determines that the received CAN command is not normal (No in Step S1202), the notification unit 1105 causes the second communication unit 1103 to transmit, to the first GW 801, the predetermined notification to disable the transfer function of the first GW 801 (Step S1203). Moreover, the notification unit 1105 causes the third communication unit 1104 to transmit, to the second GW 802, the predetermined notification to enable the transfer function of the second GW 802 (Step S1206).

The communication unit 903 of the first GW 801 receives the aforementioned notification from the information processing device 803 (Step S1204). Then, the disabling unit 904 causes the first transmission-reception unit 901 to stop the transfer processing, thereby the CAN-command transfer function of the first GW 801 is disabled (Step S1205).

Moreover, the communication unit 1003 of the second GW 802 receives the aforementioned notification from the information processing device 803 (Step S1207). In response to this, the enabling unit 1004 causes the second transmission-reception unit 1001 to start the transfer processing, thereby the transfer function of the second GW 802 is enabled (Step S1208), and the second GW 802 starts transferring of CAN commands. After this, the second GW 802 receives the CAN command and the second transmission-reception unit 1001 performs the transfer processing by which the received CAN command is transmitted to the CAN bus that is the transfer destination determined based on the transfer-list stored in the transfer-list storage unit 1002.

According to the present embodiment described thus far, the information processing system 80 includes the first GW 801, the second GW 802, and the information processing device 803 which are connected via the CAN buses and the dedicated lines. When it is determined in the information processing device 803 that the received CAN command is not normal, the information processing device 803 transmits, to the first GW 801 via the dedicated line 601, the notification to disable the transfer function of the first GW 801. Moreover, the information processing device 803 transmits, to the second GW 802 via the dedicated line 602, the notification to enable the transfer function of the second GW 802. When receiving this notification from the information processing device 803, the first GW 801 disables the transfer function of the first GW 801. When receiving this notification, the second GW 802 enables the transfer function of the second GW 802. After this, the transfer processing for the communication data is performed by the second GW 802 having the active transfer function. Hence, the function of the information processing system 80 is maintained. The notifications to enable and disable the respective transfer functions as described above are transmitted via the dedicated lines 601 and 602 safely and reliably. With this, the information processing system 80 that has redundancy to support functional safety and security can be provided.

Variations etc.

Embodiments 1 and 2 have been described thus far as examples of the technology according to the present invention. However, the technology according to the present invention is not limited to Embodiments described above. The technology according to the present invention is applicable to other embodiments implemented through, for example, changes, replacements, additions, and omissions as appropriate. For example, variations described below are also included in the scope in an aspect or aspects according to the present invention.

[1] The notification to enable or disable the transfer function of a gateway in each of the embodiments may be transmitted, through a path via a CAN bus, using a CAN command to which a message authentication code (hereinafter, referred to as a "MAC" that is an acronym standing for the message authentication code) is attached. A specific description is as follows.

In Embodiment 1 for example, when the information processing device 103 transmits the predetermined notification to the second GW 102 via one of the CAN buses, a MAC for transmission of this notification may be attached.

Moreover, in Embodiment 1, the second GW 102 may transmit the notification to disable the transfer function of the first GW 101, to the first GW 101 via one of the CAN buses instead of the dedicated line 600. Here, the second GW 102 may attach a MAC to the CAN command used for transmitting this notification.

Furthermore, in Embodiment 2, the information processing device 803 may transmit the notification to disable the transfer function of the first GW 801, to the first GW 801 via one of the CAN buses instead of the dedicated line 601. Here, the information processing device 803 may attach a MAC to the CAN command used for transmitting this notification.

Moreover, in Embodiment 2, the information processing device 803 may transmit the notification to enable the transfer function of the second GW 802, to the second GW via one of the CAN buses instead of the dedicated line 602. Here, the information processing device 803 may attach a MAC to the CAN command used for transmitting this notification.

As a result, the transfer functions of the gateways can be prevented from being disabled or enabled by a notification that is compromised in integrity due to tampering or error or by an unauthorized transmitted notification.

In the configuration using the MAC as described above, a processing load of the MAC is placed on the gateways and on an arithmetic processing device of the information processing device. Moreover, a part of the data field is occupied by the MAC. On this account, an arithmetic processing device with a high processing capability and a MAC with a reduced data length may be used.

Moreover, in the above embodiments, the notification transmitted via the CAN bus may be transmitted through a path via a dedicated line used for transmitting this notification. To be more specific, in Embodiment 1, the information processing device 103 may be connected to the second GW 102 via a dedicated line different from the dedicated line 600 that is used for direct communication between the information processing device 103 and the second GW 102. Then, the predetermined notification may be transmitted from the information processing device 103 to the second GW 102 via this dedicated line instead of the CAN bus. With this, the predetermined notification is transmitted safely and reliably.

Suppose that, in each of the above variations of the embodiments, the information processing device transmits the notification to the corresponding gateway via, for example, a physical port for CAN communication instead of the dedicated line. In this case, each of the communication units (the first communication unit 401, the second communication unit 1103, and the third communication unit 1104) may be implemented as a dedicated port used for transmitting this notification.

[2] In the embodiments and variations described above, the information processing device may transmit the aforementioned notification via at least two or all of the CAN buses using the same CAN command so that the gateway may verify correctness of this notification transmitted from the information processing device via the CAN bus. With this, the gateway can compare the CAN commands received from the CAN buses. Then, when the CAN commands are different, the gateway can determine the correct CAN command by performing majority voting.

[3] In the embodiments and variations described above, the transfer function of the gateway may be disabled (the transfer processing of the transmission-reception unit is stopped) electrically, physically, or using a software program.

For example, the transfer function may be disabled electrically by shutting down the gateway. Moreover, the transfer function may be disabled physically by disconnecting the gateway and the CAN buses. Furthermore, a software operation of the gateway in which the transfer function is to be disabled may be stopped. Such a forced termination may be executed by the gateway itself in which the transfer function is to be disabled. Alternatively, the forced termination may be executed externally by the other gateway or the ECU.

[4] When the connection between the gateway and the CAN buses or the software operation is terminated as described above, the transfer function of the gateway may be disabled partially.

For example, only the connection to the CAN bus from which the unauthorized CAN command is detected may be physically disconnected. Alternatively, only the software operation related to the transfer function that is performed via this CAN bus may be terminated. To achieve such a partial disablement, the notification to disable the transfer function of the gateway may include information indicating the CAN bus through which the CAN command determined as being abnormal by the monitoring unit 402 (or 1102) passes.

It should be noted that, in accordance with this partial disablement of the transfer function of the gateway, the transfer function of the other gateway may be enabled partially.

[5] Moreover, when the connection between the gateway and at least one of the CAN buses is disconnected as described above, the connection between the gateway and the ECU may be disconnected in a stepwise manner.

For example, predetermined priorities are assigned to the plurality of CAN buses connected to the gateways, on the basis of, for instance, the functions of the ECUs connected to the CAN buses or types of CAN commands that pass through the CAN buses. Then, the connection between the gateway and the corresponding CAN bus may be disconnected in order of priority. These priorities may be assigned depending on an amount of risk (damage) caused by an attack. In the case of the in-vehicle network as an example, suppose that the ECU of the CAN bus 1 has a function as a driving operation system and that the ECU of the CAN bus 2 has a function of an operation of doors, mirrors, seats, and so forth. In this case, the CAN bus 1 is assigned a higher priority.

Moreover, after an unauthorized CAN command is detected, the connection between the communication ECU and the gateway is firstly disconnected in order for the information processing system 10 (or 80) to communicate with an external source. Then, before another unauthorized CAN command is detected, a whole or part of the transfer function of the present gateway may be disabled.

[6] In the embodiments and variations described above, the state of the two gateways in the normal time is not limited to the state in which the transfer function of one of the gateways is active and the transfer function of the other one of the gateways is inactive.

For example, one of the two gateways may be a main gateway and the other one may be a sub-gateway, and both of the transfer functions of these gateways may be active in the normal time. Then, the transfer function of the main gateway may be complemented by the transfer function of the sub-gateway. As a specific example of the complement, the sub-gateway may monitor the CAN buses and, when the main gateway fails to transfer a CAN command, may transfer this CAN command. When the CAN command is determined as being abnormal in the information processing system having this configuration, the notification transmitted from the monitoring ECU is used for disabling the transfer function of the main gateway. However, this notification does not need to be used for enabling the transfer function of the sub-gateway.

[7] In the embodiments and variations described above, only one of the two gateways is connected communicably to the external network via the communication ECU. However, the configuration of the information processing system according to the present invention is not limited to this. Both of the two gateways may be physically and communicably connected to the external network. Moreover, the function of one of the gateways for communicating with the external network may be inactive in the normal time. Then, this function of the present gateway may be enabled when the communication function of the other gateway is disabled.

In the above description, even when an abnormal CAN command is received, the function of the information processing system is maintained by the transfer function executed as an alternative. However, this communication-dependent function is limited in the information processing system in which the communication path to the information processing device is disconnected unless it is a normal time.

[8] The two gateways described in the above embodiments and variations are not limited to two gateways. The two gateways may be physically implemented on a single ECU, and may be implemented as a logically-independent function module that is provided by, for example, a software program.

In the embodiments and variations described above, the gateway on standby in the normal time and the monitoring ECU that implements the information processing device 103 (or 803) may be physically combined into one. This gateway may be implemented as a function module provided by, for example, a software program.

[9] Suppose that the CAN command is determined as being abnormal in the information processing device in the embodiments and variations described above. In this case, the information processing device or the gateway may transmit, to the ECU that is determined as receiving this CAN command based on the CAN ID of this CAN command, a notification to switch the ECU to a fail-safe mode. This notification may be provided by any of the following: transmission via the CAN bus; transmission via a dedicated line separately provided between the ECU and the information processing device or the gateway; and transmission with a MAC attached. In response to this notification, the ECU switches to the fail-safe mode and thereby avoid an influence of the control by the unauthorized CAN command. The fail-safe mode mentioned here refers to a mode in which, in the case of an automobile for example, electronic control except for a minimum function allowing the automobile to be driven may be disabled. Moreover, in this mode, the automobile may be driven to stop with minimum functions for safety.

[10] In the embodiments and variations described above, when the received CAN command is abnormal, the transfer functions of the gateways are switched between being disabled and being enabled. However, the present invention is not limited to this configuration.

For example, a system on an in-vehicle network may be already provided with redundancy (may be multiplexed) in some cases with ECUs related to various functions of the ADAS or ECUs related to an automated driving function. According to the present invention, to keep even these ECUs for redundancy from an attack, the function of the main one of the ECUs may be disabled (forcefully terminated) and the function of the other ECU may be enabled to perform alternative processing.

[11] In the embodiments and variations described above, the system is included in the network that allows the CAN communication. However, an application scope of the present invention is not limited to this. The present invention is applicable to a system included in a network that allows a different communication method. For example, the present invention is applicable to systems that employ communication methods, such as CAN with flexible data-rate (CAN FD), a time triggered CAN (TT-CAN), Ethernet (registered trademark), a local interconnect network (LIN), media oriented systems transport (MOST) (registered trademark), and FlexRay (registered trademark).

[12] Some or all of the components included in each of the above-described devices may be implemented as an IC card or a standalone module that can be inserted into and removed from the corresponding device. The IC card or the module is a computer system configured with a microprocessor, a ROM, a RAM, and so forth. The IC card or the module may include the aforementioned super multifunctional LSI implemented by a high-density integrated circuit. The microprocessor operates according to the computer program, so that a function of the IC card or the module is carried out. The IC card or the module may be tamper resistant.

[13] The present invention may be the methods including the processing steps of the operations performed by the devices described above. Each of the methods may be a computer program causing a computer to execute the steps included in the method. Moreover, the present invention may be a digital signal of the computer program.

Moreover, the present invention may be the aforementioned computer program or digital signal recorded on a computer-readable recording medium, such as a flexible disk, a hard disk, a compact disc (CD)-ROM, a magneto-optical (MO) disk, a digital versatile disc (DVD), a DVD-ROM, a DVD-RAM, a Blu-ray (registered trademark) disc (BD), or a semiconductor memory. Also, the present invention may be the digital signal recorded on such a recording medium.

Furthermore, the present invention may be the aforementioned computer program or digital signal transmitted via a telecommunication line, a wireless or wired communication line, a network represented by the Internet, and data broadcasting.

Also, the present invention may be a computer system including a microprocessor and a memory. The memory may store the aforementioned computer program and the microprocessor may operate according to the computer program.

Moreover, by transferring the recording medium having the aforementioned program or digital signal recorded thereon or by transferring the aforementioned program or digital signal via the aforementioned network or the like, the present invention may be implemented by a different independent computer system.

[14] The embodiments and variations of the embodiments described above may be combined.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

When detecting that unauthorized communication data is injected into a network by an attack, the information processing device, the information processing system, the information processing method, and the information processing program according to the present invention can eliminate the attack and also maintain the function of the network. The information processing device and so forth are useful for enhancing safety of a product that operates on a network or that includes a network.

The invention claimed is:

1. An information processing device, comprising:
a first communication unit configured to transmit and receive communication data through a network, the network being connected to a first gateway, a second gateway, and at least one electronic control unit;
a monitoring unit configured to determine whether the communication data received by the first communication unit is normal; and
a notification unit configured to transmit, at least to the second gateway, a first notification to cause a first one of a transfer function of the first gateway and a transfer function of the second gateway to be active and a second one of the transfer function of the first gateway and the transfer function of the second gateway to be inactive, when the monitoring unit determines that the communication data is not normal,
wherein, when the monitoring unit determines that the communication data received by the first communication unit is not normal and in a case where the transfer function of the first gateway is active and the transfer function of the second gateway is inactive, the notification unit is configured to (i) cause the second gateway to transmit, to the first gateway, a second notification to disable the transfer function of the first gateway and (ii) transmit, to the second gateway, a third notification to enable the transfer function of the second gateway.

2. The information processing device according to claim 1, further comprising:
a second communication unit which is different from the first communication unit,
wherein, when the monitoring unit determines that the communication data is not normal, the notification unit is configured to transmit the third notification to the second gateway via the second communication unit.

3. The information processing device according to claim 2,
wherein the second communication unit is configured to be connected to the second gateway via a dedicated line used for direct communication between the second communication unit and the second gateway.

4. The information processing device according to claim 1,
wherein the first communication unit is configured to execute controller area network (CAN) communication.

5. The information processing device according to claim 1, wherein the third notification indicates that the communication data received by the first communication unit is not normal and one of that the transfer function of the first gateway is to be disabled and that the transfer function of the second gateway is to be enabled.

6. An information processing system, comprising:
the information processing device according to claim 1;
the first gateway;
the second gateway; and
the at least one electronic control unit,
wherein the first gateway includes:
  a first transmission-reception unit configured to provide the transfer function of the first gateway; and
  a disabling unit configured to cause the first transmission-reception unit to stop transfer processing,
the second gateway includes:
  a second transmission-reception unit configured to provide the transfer function of the second gateway; and
  an enabling unit configured to cause the second transmission-reception unit to start transfer processing, and
when the monitoring unit determines that the communication data received by the first communication unit is not normal, the notification unit transmits the third notification at least to the second gateway.

7. The information processing system according to claim 6, further comprising:
a dedicated line which is used only for communication between the first gateway and the second gateway,
wherein the second gateway further includes a disablement notification unit configured to transmit, to the first gateway, the second notification to disable the transfer function of the first gateway,
the disablement notification unit is configured to transmit, to the first gateway via the dedicated line, the second notification to disable the transfer function of the first gateway, when the second gateway receives the third notification from the notification unit, and
the disabling unit is configured to cause the first transmission-reception unit to stop the transfer processing when the first gateway receives the second notification to disable the transfer function of the first gateway.

8. The information processing system according to claim 7,
wherein the first gateway has a connection path used for communication between the information processing system and an external source, and
the disabling unit is configured to:
  disconnect the connection path when the first gateway receives the second notification to disable the transfer function of the first gateway; and
  further cause the first transmission-reception unit to stop the transfer processing when the first gateway further receives the second notification to disable the transfer function of the first gateway while the connection path is disconnected.

9. The information processing system according to claim 7,
wherein the first gateway is configured to be connected to a plurality of lines included in the network, the plurality of lines being connected to the at least one electronic control unit, and
the disabling unit is configured to cause the first transmission-reception unit to stop the transfer processing by terminating a connection between the first gateway and at least one of the plurality of lines that is selected in order of predetermined priority.

10. The information processing system according to claim 7,
wherein the first gateway is connected to a plurality of lines included in the network, the plurality of lines being connected to the at least one electronic control unit,
the second notification to disable the transfer function of the first gateway indicates, among the plurality of lines, a line through which the communication data determined as not being normal by the monitoring unit passes, and
the disabling unit is configured to cause the first transmission-reception unit to stop the transfer processing by terminating a connection between the first gateway and the line indicated by the second notification.

11. The information processing system according to claim 6,
wherein, when the monitoring unit determines that the communication data received by the first communication unit is not normal, the notification unit is further configured to transmit, to an electronic control unit that is included in the at least one electronic control unit and that receives the communication data, a fourth notification to switch the electronic control unit to a fail-safe mode.

12. An information processing method executed by an information processing device, the information processing device being connected to a network, the network being connected to a first gateway, a second gateway, and at least one electronic control unit, the information processing method comprising:
transmitting and receiving communication data through the network;
determining whether the communication data is normal;
transmitting, at least to the second gateway, a first notification to cause a first one of a transfer function of the first gateway and a transfer function of the second gateway to be active and a second one of the transfer function of the first gateway and the transfer function of the second gateway to be inactive, when the communication data is determined as not being normal in the determining; and
when determining that the communication data is not normal in a case where the transfer function of the first gateway is active and the transfer function of the second gateway is inactive, (i) causing the second gateway to transmit, to the first gateway, a second notification to disable the transfer function of the first gateway and (ii) transmitting, to the second gateway, a third notification to enable the transfer function of the second gateway.

13. A non-transitory computer-readable recording medium having a computer program recorded thereon for causing the information processing device to execute the information processing method according to claim 12.

14. An information processing device, comprising:
a first circuit configured to transmit and receive communication data through a network, the network being connected to a first gateway, a second gateway, and at least one electronic control unit;
a second circuit configured to determine whether the communication data received by the first circuit is normal; and
a third circuit configured to transmit, at least to the second gateway, a first notification to cause a first one of a transfer function of the first gateway and a transfer function of the second gateway to be active and a second one of the transfer function of the first gateway and the transfer function of the second gateway to be inactive, when the monitoring unit determines that the communication data is not normal, wherein, when the second circuit determines that the communication data received by the first circuit is not normal and in a case where the transfer function of the first gateway is active and the transfer function of the second gateway is inactive, the third circuit is configured to (i) cause the second gateway to transmit, to the first gateway, a second notification to disable the transfer function of the first gateway and (ii) transmit, to the second gateway, a third notification to enable the transfer function of the second gateway.

* * * * *